March 22, 1927.

P. HANSMANN ET AL 1,621,633

ANTISIDE DRAFT PLOW HITCH

Filed Nov. 12, 1920

Inventors,
Paul Hansmann
Herman Strack
by A. S. Johnson
their Attorney.

Patented Mar. 22, 1927.

1,621,633

UNITED STATES PATENT OFFICE.

PAUL HANSMANN AND HERMAN STRACK, OF LONG PRAIRIE, MINNESOTA, ASSIGNORS, BY MESNE ASSIGNMENTS, TO THE SAID HANSMANN.

ANTI-SIDE-DRAFT PLOW HITCH.

Application filed November 12, 1920. Serial No. 423,673.

This invention relates to devices for use in connecting implements such as plows to tractors, and more particularly to hitching means to be used in connection with what are known in the art as two wheel tractors.

Some of the two wheel tractors in use, are provided with a readily removable trailing truck for use in transportation from place to place and to perform light general work, while others are equipped with suitable caster wheels for the same purpose.

Some of the former are adapted to be hitched directly to the implement to be drawn without the use of the truck, the implement in such case serving to stabilize the tractor.

An object of our invention is to provide improved means for hitching a plow to a tractor in such a manner as to keep the tractor (whether of the two or four wheel type) on unplowed ground in the process of plowing, for the purpose of securing the maximum traction efficiency of the traction wheels, and to avoid the very objectionable feature of packing the soil in the furrow by the traction wheel running therein.

It is well known, that a tilted tractor, with one wheel running on the firm top soil and the other on the soft bed of the furrow thereby causing it to run on the edges of the wheel rims instead of on the entire width thereof, loses a large percentage of its traction capacity, while at the same time the angular position of the engine subjects the parts to undue side wear, thereby reducing the efficiency of the engine.

Another object of the invention is to provide plow controlling means wherein the line of draft of the plow is located to one side of the center of draft of the tractor so that the plow will cut a furrow in the trail of one of the traction wheels, and the pivoted connection of the plow beam with the tractor is located on the opposite side of the center of draft of the tractor for the purpose of dividing the load to be pulled between the two oppositely disposed traction, wheels.

A further object is to provide plow controlling means wherein the plow is effective in offset relation to the tractor to cut a furrow in the trail of one of the tractor wheels, and to effectively counterbalance the load imposed thereby, whereby the side draft on the land side of the plow is reduced to a minimum.

One form of construction embodying the invention is shown in the accompanying drawings forming part of this specification, of which—

Figure 1:
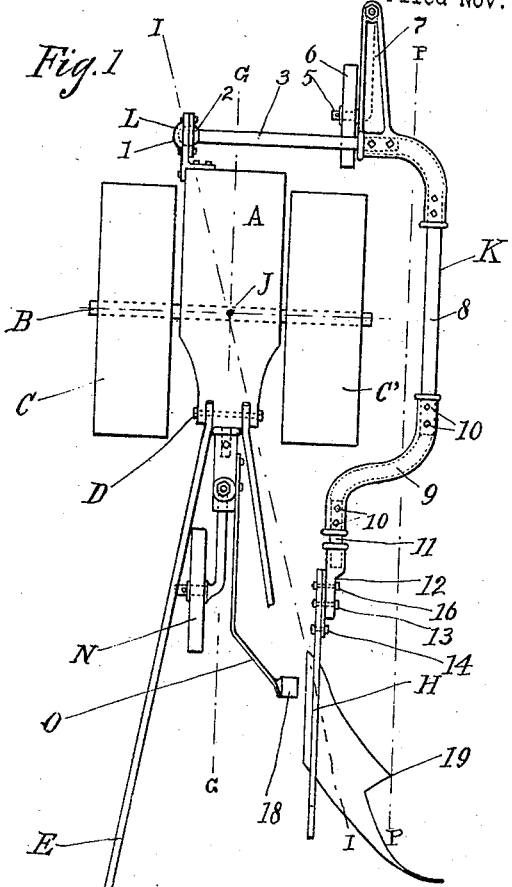
Figure 1 is a fragmentary top view of a two wheel tractor equipped with the invention.
Figure 3:
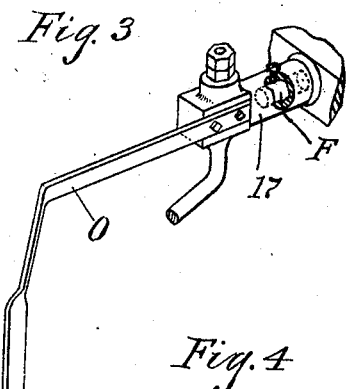
Figure 3 is a fragmentary perspective view of the engine stub shaft and the plow rest supported thereon.
Figure 4:
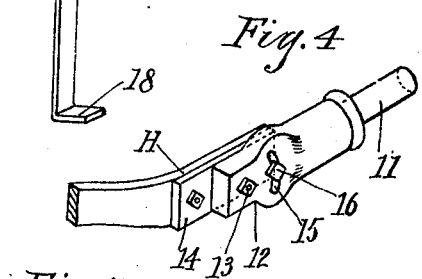
Figure 4 is a fragmentary perspective view of the adjustable joint in the plow beam.
Figure 5:
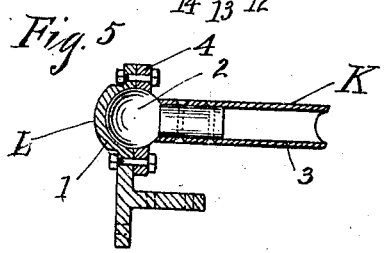
Figure 5 is a horizontal sectional view of the ball and socket connection between the tractor and the plow.

A designates the frame of a two wheel tractor including an axle B, and C and C' are traction wheels mounted on the axle and supporting said frame. Pivoted by means of the pivot pin D on the frame is the rearwardly extending steering handle E. F represents a rearwardly extending stub shaft longitudinally coincident with the center line G—G, which latter indicates the center of draft of the tractor. H designates the beam portion of the plow frame the vertical plane thereof being coincident with the line of draft of the plow. The line I—I intersects at J the center of draft of the tractor and the center of the axle B. When the load to be drawn is hitched in line with the point J it is equally divided between the two traction wheels. The line of draft of the plow corresponding to H is widely offset from the line G—G, and, as shown, is directly in line with the traction wheel C'. If the plow were hitched in line with the wheel C' the latter would carry almost the entire load, thereby relieving the wheel C and causing it to constantly pull heavily forward in a direction tending to turn the tractor with the heel C' as a pivot. This tendency to turn the tractor, is greatly intensified by the enormous side pressure or side draft, set up between the landside of the plow and the wall of the furrow, because of the natural tendency of the plow to travel in the direction indicated by the line I—I, which is a resultant direction, relative to the center of draft of the tractor and the line of draft of the plow.

Applicants have pivotally connected a twelve inch plow to the stub shaft F of a Beeman garden tractor (which type of tractor the drawing diagrammatically represents) in the axact offset relation shown, and found it impossible for one man to prevent the tractor from making a pivotal turn around the wheel C' in short spasmodic jumps until it landed in the adjacent furrow.

Applicants have applied the invention shown and now to be described, to the same tractor with the result that it kept its course and was easily steered by one man.

Figure 2:
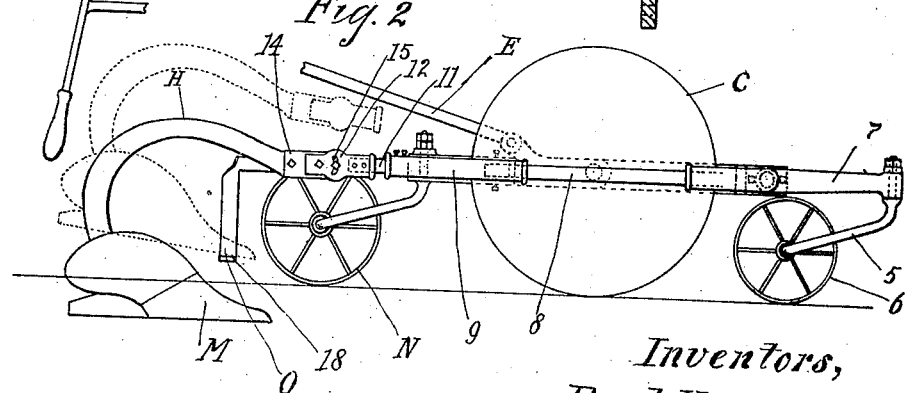
Figure 2 is a side view of same.

The invention comprises a stiff hook-shaped draft tongue K extending laterally from one side of the tractor across the front to the opposite side thereof, from which position it extends rearwardly along the side of the traction wheel C', and then inwardly and rearwardly in parallelism with the line of travel. At its forward end the draft tongue is connected to the frame A, by means of the ball and socket joint L, said joint consisting of a forwardly extending socket member 1 suitably secured to the front of the frame A, at a position forward of the axle B and preferably on the line I—I. Fitting movably into the socket of the socket member is the ball 2 at the end of the cross bar 3 of the draft tongue, a retaining flange 4 engaging the opposite side of the ball being bolted to the socket member 1 to swivelly hold the ball positioned. Extending forwardly from the cross bar 3, and having vertically journaled in its outer end the spindle shank of the rearwardly and downwardly directed caster arm 5 whereon is rotatably mounted the caster wheel 6, is the extension 7. The rearwardly extending side member 8 of the draft tongue consists preferably of a pipe rotatable fitting into the end of the S-shaped connecting member 9 having suitable set screws 10 whereby the connecting member may be circumferentially adjusted on the side member 8. Fitting likewise into the other end of the connecting member 9 is the shank 11 of the swing plate 12, said plate having a pivot bolt 13 projected through the stay plate 14 and the beam portion H of the plow frame whereby the three may be firmly bolted together. Extending through the curved slot 15 of the swing plate and through the stay plate and beam portion J is the bolt 16, whereby when the bolt 13 is slightly loosened the swing plate may be swung to vary the bite of the plow share M, the latter being suitably secured to the sheath portion of the plow frame. As shown, the stay plate 14 is separately bolted to the plow frame to serve as a stiffening member. The tractor is provided with a trailing caster wheel N the arm thereof vertically journaled in the socket block 17 fitting over the stub shaft F. Extending rearwardly and downwardly from the socket block 17 and having a horizontally disposed lip 18 located a distance from the ground, is the plow support O, adapted to support the plow, when out of use, on the lip 18 as shown in dotted lines in Figure 2.

In operation, the plow share is set as desired, by adjusting the connecting member 9 and the swing plate 12, the outer point 19 of the share extending to the vertical wall of the furrow which is indicated by the dotted line P—P.

As shown, the traction wheel C' and the caster wheel 6 are spaced a considerable distance from the edge of the furrow enabling the entire tractor to travel on unplowed ground.

By attaching the crooked draft tongue in the manner shown it is free to oscillate universally, the caster wheel 6 serving as a rolling support therefor. By attaching the tongue near the plane of the traction wheel farthest from the draft plow in the zone transversed by the resultant line of draft between the plow and tractor, the effect of the load imposed on the opposite side of the tractor is effectively counteracted, whereby the side draft at the landside of the plow is reduced to minimum.

This method of connecting the plow conserves a large part of the engine power and enables the use of a large plow share.

We claim:—

1. In an implement connection of the class described, the combination with a tractor and a plow positioned relative to the tractor to cut a furrow in the trail of one of the traction wheels, of a draft tongue connected with the plow and extending around the tractor to a point forward of the traction wheels thereof and to and beyond the longitudinal central axis of the tractor, means for supporting said draft tongue in elevated position relative to the ground, and a pivotal connection between the forward end of said draft tongue and the tractor at a position located beyond said longitudinal central axis of the tractor.

2. In a plow connection of the class described, the combination with a tractor and a plow positioned in offset relation with respect to the longitudinal center line of the tractor, of a draft tongue connected with the plow and extending partly around said tractor to a position located forward of the traction wheels, said position being disposed in offset relation with respect to said longitudinal center line and opposite said plow, and a connection at said position operatively connecting said draft tongue to the tractor.

3. In a plow connection of the class described the combination with a tractor and a plow adapted to be drawn by the tractor positioned a distance from the longitudinal center line of the tractor, of a hook-shape draft tongue including an adjustable section connected with the plow and extending outwardly and forwardly along the side and across the forward end of the tractor to and beyond the longitudinal center line thereof and having pivotal connection at its end with the tractor, said adjustable section comprising offset parallel ends telescopingly connected into the body of the tongue and capable of adjustment circumferentially to change the relative position of the plow.

4. A plow hitch for use in connection with a two wheeled tractor each of the wheels thereof being drivers, a plow behind said drivers to one side of the center line of draft, and hitching means for operatively connecting the plow to the tractor, said hitching means extending across said center of draft to a point forward of said drivers and having connection with the tractor thereat.

5. A plow hitch for use in connection with a two wheeled tractor, the wheels thereof being co-axial and drivers, a plow behind said drivers to one side of the center of draft, a draft tongue connected to said plow and extending across said center line of draft to a point forward of the axis of rotation of said drivers, and a universal connection connecting said tongue at said point, to the tractor.

6. A plow hitch for use in connection with a two wheeled tractor, the wheels thereof being co-axial and drivers, a plow behind said drivers to one side of the center line of draft, hitching means for operatively connecting the plow to the tractor, said hitching means extending across said center line of draft and forward of the axis of rotation of said drivers, and including a pivotal connection with the tractor, said connection located in a straight line intersecting said plow and a point in said axis midway between said drivers.

7. A plow hitch for use in connection with a two wheeled tractor, the wheels thereof being co-axial and drivers, a plow behind said drivers to one side of the center line of draft, a draft tongue extending from said plow across said center line of draft to a point forward of the axis of said drivers, said draft tongue being operatively connected at opposite ends, respectively, to said plow and the tractor, and adjustable means forming part of said draft tongue whereby the position of the plow relative to said draft tongue may be changed.

8. A plow hitch for use in connection with a two wheeled tractor, the wheels thereof being co-axial and drivers, a plow behind said drivers to one side of the center line of draft, a draft tongue extending from the plow across said center line of draft to a point forward of the axis of rotation of said drivers, said draft tongue being operatively connected at opposite ends, respectively, to said plow and the tractor, and adjustable means intermediate the ends and forming part of said draft tongue, whereby a lateral offset in the shaft on the tongue is effected to enable that part of the tongue adjacent the plow to be held positioned selectively at various levels.

9. In combination with a tractor, and a plow, of draft means connecting the plow to the tractor and offsetting the plow relative to the center line of the tractor, said means being connected to a forward extremity of the tractor on the opposite side of the tractor center line from the plow.

10. The combination of a tractor and a plow operative in offset relation to the tractor, the plow having a connection to the tractor at a point substantially in the resultant line of draft between the plow and tractor and in advance of the center of draft of said tractor.

In testimony whereof we affix our signatures.

PAUL HANSMANN.
HERMAN STRACK.